US011259551B2

(12) United States Patent
Moragne et al.

(10) Patent No.: US 11,259,551 B2
(45) Date of Patent: Mar. 1, 2022

(54) NATURAL COCOA ALTERNATIVE AND METHODS OF PRODUCING SAME

(71) Applicant: International Agriculture Group, LLC, Mooresville, NC (US)

(72) Inventors: Maurice Moragne, Mooresville, NC (US); Humberto Wedderburn Morales, Panama City (PA); David H. Skea, Independence, KY (US); Julio Cesar Vasquez, Fairburn, GA (US); Teresa S. Cogswell, Overland Park, KS (US)

(73) Assignee: International Agriculture Group, LLC, Mooresville, NC (US)

( * ) Notice: Subject to any disclaimer, the term of this patent is extended or adjusted under 35 U.S.C. 154(b) by 178 days.

(21) Appl. No.: 15/699,817

(22) Filed: Sep. 8, 2017

(65) Prior Publication Data

US 2018/0125107 A1 May 10, 2018

Related U.S. Application Data

(60) Provisional application No. 62/385,953, filed on Sep. 9, 2016.

(51) Int. Cl.
*A23L 5/10* (2016.01)
*A23L 19/00* (2016.01)
*A23G 1/34* (2006.01)
*A23G 1/48* (2006.01)

(52) U.S. Cl.
CPC ............... *A23L 19/01* (2016.08); *A23G 1/34* (2013.01); *A23G 1/48* (2013.01); *A23L 5/15* (2016.08); *A23V 2002/00* (2013.01)

(58) Field of Classification Search
CPC .................................. A23G 1/34; A23L 5/15
See application file for complete search history.

(56) References Cited

U.S. PATENT DOCUMENTS

| | | | |
|---|---|---|---|
| 620,209 | A | 2/1899 | Zürcher |
| 800,683 | A | 10/1905 | Romerogarcia |
| 856,479 | A | 6/1907 | Lewis |
| 857,445 | A | 6/1907 | Clarke |
| 1,564,508 | A | 12/1925 | Bauermeister |
| 1,609,993 | A | 12/1926 | Dickerson |
| 1,959,301 | A | 5/1934 | Northcutt et al. |

(Continued)

FOREIGN PATENT DOCUMENTS

| | | |
|---|---|---|
| CN | 1864553 A | 11/2006 |
| CN | 101253964 A | 9/2008 |

(Continued)

OTHER PUBLICATIONS

"Browned Flour". Southern Living Magazine. Available online as of Jan. 2013. p. 1. (Year: 2013).*

(Continued)

*Primary Examiner* — Jenna A Watts
(74) *Attorney, Agent, or Firm* — Crowell & Moring LLP

(57) ABSTRACT

A cocoa alternative or enhancer, made from roasted green banana flour, for use in a wide variety of food products. The cocoa alternative/enhancer can provide a variety of sensory attributes including aromas, flavors and textures that can be altered and controlled by careful manipulation of the roasting process.

27 Claims, 1 Drawing Sheet

(56) References Cited

U.S. PATENT DOCUMENTS

| | | |
|---|---|---|
| 2,020,257 A | 11/1935 | Dickinson |
| 3,103,439 A | 9/1963 | Williams |
| 3,134,683 A | 5/1964 | Holahan et al. |
| 3,222,183 A | 12/1965 | Rozsa et al. |
| 3,259,508 A | 7/1966 | Aguirre et al. |
| 3,393,074 A | 7/1968 | Ehrlich |
| 3,490,355 A | 1/1970 | Groth et al. |
| 3,544,337 A | 12/1970 | Bundus |
| 3,573,937 A | 4/1971 | Sama |
| 3,663,718 A | 5/1972 | Bundus |
| 3,795,744 A | 3/1974 | Ogawa et al. |
| 3,810,996 A | 5/1974 | Sutliff et al. |
| 3,843,808 A | 10/1974 | Ziccarelli |
| 4,038,433 A | 7/1977 | Manser et al. |
| 4,104,958 A | 8/1978 | Manser et al. |
| 4,242,365 A | 12/1980 | Numata et al. |
| 4,465,696 A | 8/1984 | Strahl |
| 4,784,871 A | 11/1988 | Park |
| 4,849,216 A | 7/1989 | Andersen |
| 4,886,669 A | 12/1989 | Ventouras |
| 4,935,254 A | 6/1990 | Nunez |
| 4,986,986 A | 1/1991 | Roth |
| 5,246,702 A | 9/1993 | Vecchi |
| 5,576,001 A | 11/1996 | Abu-Shaaban |
| 5,631,032 A | 5/1997 | Gil et al. |
| 5,676,993 A | 10/1997 | Watterson et al. |
| 5,738,887 A | 4/1998 | Wu |
| 5,919,513 A | 7/1999 | Kaczmarczyk |
| 5,972,399 A | 10/1999 | Lapré et al. |
| 6,017,571 A | 1/2000 | Cross et al. |
| 6,442,866 B2 | 9/2002 | Wefers |
| 6,485,773 B1 | 11/2002 | Myers et al. |
| 6,620,440 B1 | 9/2003 | Hsia et al. |
| 6,676,933 B2 | 1/2004 | Vergez et al. |
| 7,033,976 B2 | 4/2006 | Guzman |
| 7,314,644 B2 | 1/2008 | Kwak et al. |
| 7,423,106 B2 | 9/2008 | Doane et al. |
| 7,425,595 B2 | 9/2008 | Savich et al. |
| 7,591,974 B2 | 9/2009 | Savich et al. |
| 7,607,259 B2 | 10/2009 | Savich |
| 7,651,705 B2 | 1/2010 | Rao et al. |
| 7,871,657 B2 | 1/2011 | Nagappa et al. |
| 7,918,929 B2 | 4/2011 | Sunnucks |
| 8,017,147 B2 | 9/2011 | Mazed et al. |
| 8,017,553 B2 | 9/2011 | Doane et al. |
| 8,128,955 B2 | 3/2012 | Howard et al. |
| 8,192,784 B2 | 6/2012 | Anand et al. |
| 8,241,696 B2 | 8/2012 | Chung et al. |
| 8,257,694 B2 | 9/2012 | Daikeler et al. |
| 8,945,639 B2 | 2/2015 | Rhodes |
| 2004/0013772 A1 | 1/2004 | Weiss et al. |
| 2004/0133941 A1 | 7/2004 | Bowen et al. |
| 2005/0100645 A1 | 3/2005 | Baensch |
| 2006/0188631 A1 | 8/2006 | Woo et al. |
| 2006/0198937 A1 | 9/2006 | Jarrett |
| 2006/0210692 A1 | 9/2006 | Mower |
| 2007/0020373 A1 | 1/2007 | Maury |
| 2007/0122529 A1 | 5/2007 | Thai et al. |
| 2007/0286934 A1 | 12/2007 | Schallhorn |
| 2008/0050498 A1 | 2/2008 | Sherwood et al. |
| 2008/0187642 A1 | 8/2008 | Ekanayake et al. |
| 2008/0206424 A1 | 8/2008 | Villagran |
| 2008/0213412 A1 | 9/2008 | Yamada |
| 2008/0226566 A1 | 9/2008 | Poth et al. |
| 2008/0241288 A1 | 10/2008 | Thompson |
| 2008/0260924 A1 | 10/2008 | Chen et al. |
| 2009/0019905 A1 | 1/2009 | Savich et al. |
| 2009/0022853 A1 | 1/2009 | Ten Brink et al. |
| 2009/0042169 A1 | 2/2009 | Kintrup et al. |
| 2009/0087517 A1 | 4/2009 | Freestone et al. |
| 2009/0087519 A1 | 4/2009 | Hundscheid et al. |
| 2009/0136642 A1 | 5/2009 | Singh-Meneghini |
| 2009/0208607 A1 | 8/2009 | Bunke et al. |
| 2009/0324761 A1 | 12/2009 | Khoo et al. |
| 2010/0233128 A1 | 6/2010 | Panasenko |
| 2010/0166888 A1 | 7/2010 | Luber et al. |
| 2010/0189767 A1 | 7/2010 | Shimoni et al. |
| 2010/0189843 A1 | 7/2010 | Xie et al. |
| 2011/0104335 A1 | 5/2011 | Rumbaut et al. |
| 2011/0262612 A1 | 10/2011 | Götz et al. |
| 2012/0165289 A1 | 6/2012 | Rhodes et al. |
| 2012/0180964 A1 | 7/2012 | Heinricher |
| 2012/0189751 A1 | 7/2012 | Beinecke et al. |
| 2013/0156893 A1 | 6/2013 | Han |
| 2013/0310457 A1 | 11/2013 | Ramesh |
| 2013/0330444 A1 | 12/2013 | Barbosa Senra Lopes et al. |
| 2015/0050415 A1 | 2/2015 | Oviasu |
| 2015/0080297 A1 | 3/2015 | Goedhart et al. |
| 2015/0093776 A1 | 4/2015 | Yoon et al. |
| 2015/0140163 A1 | 5/2015 | Deckard et al. |
| 2015/0189901 A1 | 7/2015 | Baker |
| 2015/0216918 A1 | 8/2015 | Nair |
| 2015/0250203 A1 | 9/2015 | Edwards et al. |
| 2015/0366248 A1 | 12/2015 | Yang et al. |
| 2016/0037811 A1 | 2/2016 | Xiao et al. |
| 2016/0106125 A1 | 4/2016 | Rascon |
| 2018/0070602 A1 | 3/2018 | Moragne et al. |

FOREIGN PATENT DOCUMENTS

| | | |
|---|---|---|
| CN | 102415444 A | 4/2012 |
| DE | 197 30 150 C1 | 10/1998 |
| JP | 2009-153419 | 7/2009 |
| WO | 97/26889 A1 | 7/1997 |
| WO | 99/53777 A1 | 10/1999 |
| WO | 2007/099506 A1 | 9/2007 |
| WO | 2007/137198 A1 | 11/2007 |
| WO | 2008/032888 A1 | 3/2008 |
| WO | 2013/016198 A1 | 1/2013 |
| WO | 2013/078379 A2 | 5/2013 |
| WO | 2013/129712 A1 | 9/2013 |
| WO | 2014/102835 A1 | 7/2014 |
| WO | 2014/167372 A2 | 10/2014 |
| WO | 2015/023935 A2 | 2/2015 |
| WO | 2015/148523 A1 | 10/2015 |
| WO | 2016/070017 A1 | 5/2016 |
| WO | 2016/081012 A1 | 5/2016 |
| WO | 2016/096232 A1 | 6/2016 |
| WO | 2016/156426 A1 | 10/2016 |

OTHER PUBLICATIONS

"How and why to Toast FLour". Bon Appetit. Available online as of May 6, 2011. pp. 1-4. (Year: 2011).*

Oluwalana, et al. "Proximate composition, rheological and sensory qualities of plantain flour blanched under three temperature regimes". Available online as of Nov. 2011. African Journal of Food Science, vol. 5 (14), pp. 769-774. (Year: 2011).*

Piggot. et al. "Understanding Natural Flavors". 1994 edition. Springer Science Publisher. pp. 1-19. (Year: 1994).*

Ideas in Food. "Toasted Flour". Available online from blog.ideasinfood.com, as of Jul. 26, 2015. pp. 1-4. (Year: 2015).*

Adegboyega. Chemical Composition of Unripe and Ripe Plantain. J. Sci. Fd Agric. 1973, 24, 703-707. (Year: 1973).*

Jiang, et al. "Astringency, a more stringent definition". Available online as of May 23, 2014 from Chem. Senses 39: 467-469, 2014. pp. 1-3. (Year: 2014).*

Hui, ed. "Handbook of Fruit and Vegetable Flavors". John Wiley and Sons Publisher, 2010. p. 284. (Year: 2010).*

Bezerra et al. "Nutritional potential of green banana flour obtained by drying in spouted bed". Rev. Bras.Frutic. vol. 35, Jaboticabal Dec. 2013. pp. 1-7. (Year: 2013).*

International Search Report and Written Opinion for Application No. PCT/US2017/050786 dated Jan. 30, 2018.

International Search Report and Written Opinion for Application No. PCT/US2018/022232 dated Jan. 30, 2019.

Patent Cooperation Treaty International Searching Authority, The International Search Report and Written Opinion for application No. PCT/US2017/050793, dated Dec. 26, 2017, 13 pages.

Peroni-Okita, et al.; The cold storage of green bananas affects the starch degradation during ripening at higher temperature; Carbohydrate Polymers; 96 (2013); pp. 137-147.

(56) References Cited

OTHER PUBLICATIONS

Sharar; Lactic acid fermentation of pasteurized and powdered milk and optimizing the factors affecting the fermentation process; Brac University; Dec. 2013; pp. 1-71.
Extended European Search Report, dated Apr. 17, 2020, for European Patent Application No. 17849663.4, 9 pgs.
Extended European Search Report for corresponding European application No. 18852913.5, dated Oct. 6, 2021, 8 pgs.
Anonymous: "How to Make the Best Banana Flour Brownies"; Sunwarrior, May 11, 2017; retrieved from the Internet: URL: https://sunwarrior.com/blogs/health-hub/banana-flour-brownies (retrieved on Oct. 11, 2021), 2 pgs.
Rosa, et al., "All Rights Reserved: Effect of substituting of cocoa powder for carob flour in cakes made with soy and banana flours," International Food Research Journal, Jan. 1, 2015, pp. 2111-2118; retrieved from the Internet URL :http://ifrj.upm.edu.my/22%20(05% 202015/(51) (retrieved on Oct. 11, 2021), 8 pgs.

\* cited by examiner

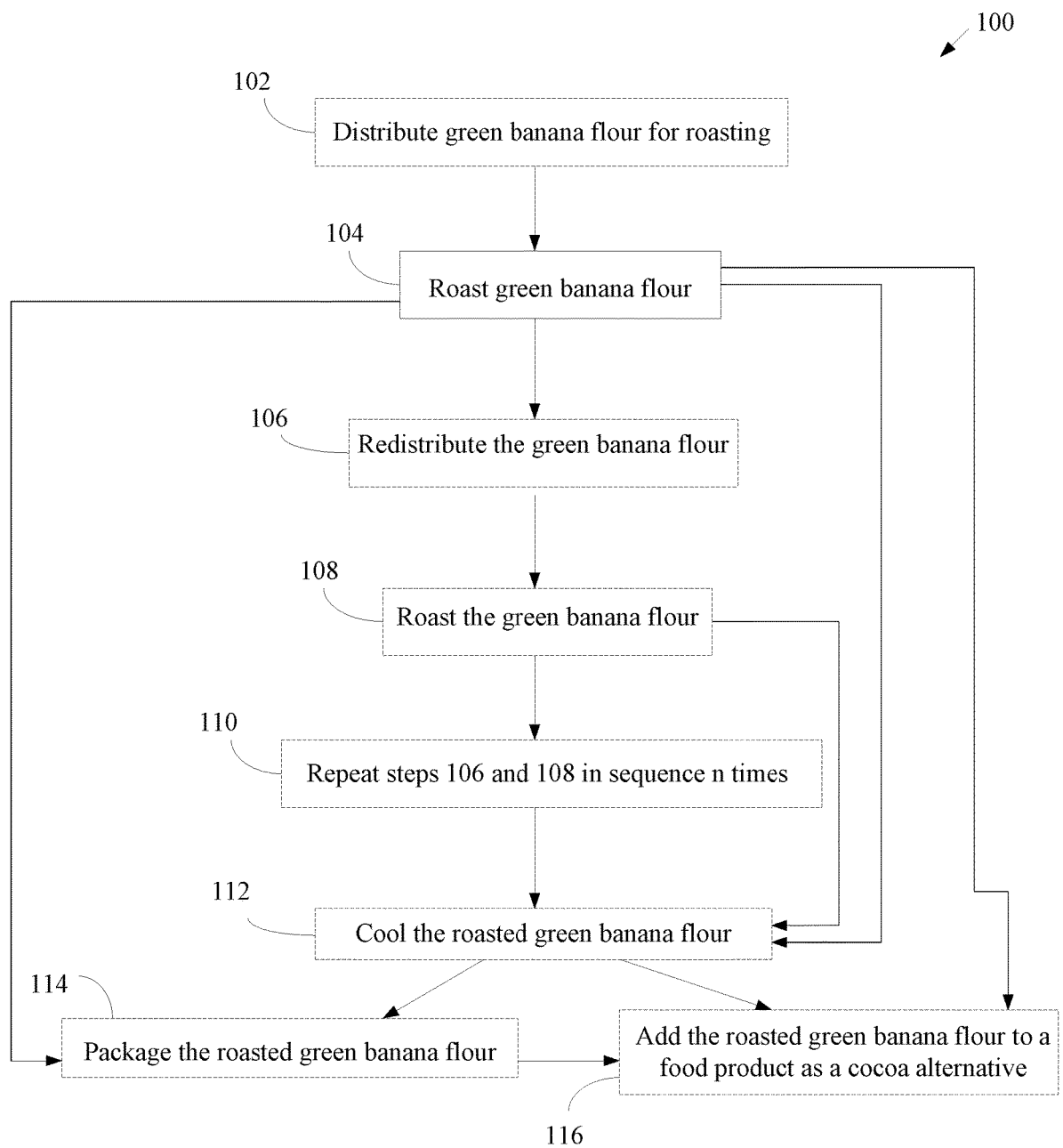

NATURAL COCOA ALTERNATIVE AND METHODS OF PRODUCING SAME

CROSS-REFERENCE TO RELATED APPLICATION

This application claims priority to U.S. Provisional Patent Application Ser. No. 62/385,953 filed Sep. 9, 2016, the contents of which application are hereby incorporated by reference in their entirety.

TECHNICAL FIELD

The present disclosure is directed towards a cocoa replacer/alternative/substitute or cocoa enhancer that can be used in a wide range of food products.

BACKGROUND

Cocoa is a high demand, relatively expensive ingredient used in a wide range of food products.

The benefits of cocoa and products made from cocoa are numerous. For example, studies suggest that dark chocolate can reduce the risk of cardiovascular disease. Moreover, unsweetened cocoa is relatively low in calories, and contains essential minerals that support heart, bone, and immune system health.

The taste of cocoa is also cherished worldwide and is the basis for drinks and confectionary products of all levels of quality and variety of taste profiles.

Cocoa is derived from the beans of the cacao plant. Typically, the beans are cold pressed and the fats ("butter") pressed out of the beans, yielding powdered cacao, that still contains "living" enzymes from the beans. Cocoa is the roasted (usually at high heat) cacao powder, which deactivates the enzymes. The butter is then added back into the cocoa to produce chocolate (usually with the addition of sugar and other ingredients to enhance flavor and mouthfeel (sensory attributes)). There are a wide variety of cocoa flavors, depending on, e.g., the type of cacao beans and the region in which they are grown, the amount of sugar present, the amount of free amino acids present, and the cocoa color pigments.

There is also a variety of synthetic chocolate flavors that can contain many different synthetic (organic) compounds. Some examples of materials that can be blended to create the artificial tastes and smells of cocoa include butyraldehyde, cocoa hexenal, cocoa pentenal, cocoa resinoid, dimethyl pyrazine, butyl cinnamate, butyl-3,5-(and 3,6)-dimethyl pyrazine and other compounds.

In addition, cocoa pricing can be volatile and the industry can experience tight supplies as emerging markets are increasing their consumption of chocolate and cocoa-based products.

The food industry would welcome a way to both reduce and/or replace the usage of cocoa or chocolate in a range of food products with a natural (i.e., non-synthetic) alternative to cocoa.

SUMMARY

In general terms, the present disclosure is directed to an all-natural cocoa substitute made from green banana flour or plantain flour, and methods of producing the same. In a given food product that ordinarily contains cocoa, a cocoa substitute of the present disclosure can be used to replace at least a substantial portion and/or enhance the cocoa. In a given food product that ordinarily contains cocoa, a cocoa substitute of the present disclosure can replace at least a substantial portion of the cocoa in the product.

According to certain aspects of the present disclosure, a cocoa substitute is prepared by dry heating (e.g., roasting) green banana flour and/or plantain flour at a predefined temperature for a predefined time. The roasted flour can then be added to a food product to replace and/or enhance cocoa.

According to certain aspects of the present disclosure, an edible composition is provided comprising cocoa powder and roasted flour made from green banana and/or plantain, the cocoa powder and the roasted flour having a combined total mass, the roasted flour having a mass from 5% to 90% of the combined total mass.

According to certain aspects of the present disclosure, a cocoa replacer and/or enhancer produced by a method of the present disclosure substantially shares at least one and up to six or more sensory attributes in common with cocoa. In some examples, a food product made with a cocoa replacer and/or enhancer produced by a method of the present disclosure substantially shares at least one and up to six or more sensory attributes in common with a reference food product containing the same formulation as the food product, except wherein in the reference food product cocoa is substituted for the cocoa replacer and/or enhancer. Such sensory attributes can include, for example, a chocolate odor/aroma, a chocolate flavor, chocolate viscosity, bitterness, a toasted odor/aroma, a toasted flavor, a brown color resembling cocoa or chocolate, sweetness, and/or a melting quality.

In accordance with certain examples of the cocoa alternatives of the present disclosure, the bananas used to make the cocoa alternative are in Stage 1 or Stage 2 of ripeness. In other examples, the bananas used contain less than 1% sugar content.

As mentioned, cocoa and chocolate have a known sensory profile that gives the products certain attributes that identify the products as cocoa or chocolate. Thus, in accordance with certain aspects of the present disclosure, a cocoa replacer and/or enhancer has a sensory profile that is within a range of cocoa or chocolate sensory profiles, and/or within a predetermined deviation from a cocoa or chocolate sensory profile, e.g., within a range of +/−50%, +/−30%, or +/−10% of a cocoa or chocolate sensory profile.

In addition, food products made with the roasted green banana flour and/or plantain flour in accordance with the present disclosure can share texture profiles, at least within a predetermined deviation, with reference products having the same formulation except wherein cocoa is substituted for the roasted green banana/plantain flour.

Thus, it has been discovered that roasted green banana flour and roasted plantain flour can provide an economical alternative to cocoa or chocolate with similar sensory attributes. When roasting green banana flour/plantain flour in specific conditions, it has been discovered that the material can develop a cocoa-like flavor, aroma, and color. Thus, in accordance with the present disclosure, roasted green banana flour/plantain flour has the possibility to at least partially replace cocoa or chocolate in many food applications.

BRIEF DESCRIPTION OF THE DRAWING

The FIGURE is a flow chart showing an example method of preparing roasted green banana flour in accordance with the present disclosure.

DETAILED DESCRIPTION

Seven stages have been described in the ripening of the banana. Stage 1 is when the banana is completely green and has no signs of yellow on the skin. Stage 2 starts to show some slight signs of yellow usually at the distal end (the end farthest from the banana's point of attachment to the tree) of the banana. At the next three stages, the yellow continues from the distal end towards the proximal end of the fruit. At stage 6 of the ripening the banana is completely yellow. Stage 7 is when the banana starts to develop brown spots and finally turns completely brown.

As a banana ripens, the starch in its pulp converts to sugar. Thus, the starch present in the banana is being converted to sugars and the flavor changes from an earthy mild taste to the banana (isoamyl acetate) taste one normally associates with ripe bananas. During the ripening process, the granular starch found in green bananas is being converted to soluble starches and further to sugars.

Thus, for a given banana, each ripening stage can be correlated with its sugar content, which is defined herein as the percentage mass of sugars (sucrose, glucose, fructose) of the total mass of that banana's pulp. For purposes of this disclosure: a Stage 1 banana has a sugar content of 2% or less; a Stage 2 banana has a sugar content greater than 2% up to and including 5%; a Stage 3 banana has a sugar content greater than 5% up to and including 10%; a Stage 4 banana has a sugar content greater than 10% up to and including 25%; a Stage 5 banana has a sugar content greater than 25% up to and including 45%; a Stage 6 banana has a sugar content greater than 45% up to and including 65%; and a Stage 7 banana has a sugar content greater than 65%.

As used herein, and unless otherwise noted, the term "green banana" encompasses bananas that are in any of ripeness Stages 1, 2, 3, or 4 as defined herein. The term "green banana" further encompasses plantains having sugar content corresponding to that of any of ripeness Stages 1, 2, 3, and 4 defined herein, as plantains are very similar in composition of starch and proteins to green bananas.

As used herein, the term "slurry" refers to the material from peeled mashed green bananas.

Green banana flour is the resultant product of drying green banana slurry. Generally, green banana flour is generated by drying green banana slurry at a relatively low temperature so as to minimize disruption of the structure of the starch and protein native to the green banana.

Native green banana flour is a type of green banana flour in which the starch is in the native granular form. That is, the starch has not been physically or chemically modified.

Already gelatinized (or pre-gelatinized) green banana flour is another type of green banana flour in which the native granular structure of the starch has been partially or completely destroyed in the flour. Some example methods for preparing a pre-gelatinized green banana flour include, but are not limited to, drum drying, spray drying or cooking native green banana flour, followed by precipitation, sonification, or the like.

As used herein, the term "green banana flour" encompasses both native green banana flour and pre-gelatinized green banana flour, unless otherwise noted.

By processing green banana flour with the application of direct and/or indirect heat (e.g. heat from radiant, microwave, solar, and/or convection sources), it has been found that the existing chemical compounds found within the green banana flour can be changed.

Under certain conditions, roasting (i.e., dry heating via one or more direct and/or indirect heating sources) green banana flour changes the flavor and/or aroma notes of the flour such that sensory attributes of chocolate or cocoa can be recognized. This roasted green banana flour, acting as a cocoa/chocolate alternative, can be used in a range of food applications. Examples of such food applications include, but are not limited to, baked goods, pancake mix, cookie mix, smoothies, puddings, dry seasonings, fruit fillings, cereal bars, baby-food, confectionary additive, energy bars, nutritional bars, and many other foods that ordinarily contain cocoa.

In at least some examples of the cocoa alternatives of the present disclosure, roasting of pre-gelatinized green banana flour can result in a cocoa alternative that more closely resembles real cocoa than does roasting of native green banana flour. Without being bound by any particular theory, it is believed that the starch chains of pre-gelatinized green banana flour are more readily rearranged by the roasting process into the compounds that adopt cocoa-like attributes than are the starch chains of native green banana flour. For example, the roasting process produces complex sugars, which are at least partially responsible for the sensory (taste, smell and texture) attributes associated with such roasted products. In some examples, such sugars may be more readily achieved from roasting pre-gelatinized green banana flour than native green banana flour.

Cocoa is a complex material with a variety of sensory attributes (flavors and smells) depending on where it was grown and how it was processed (e.g., roasted). Some examples of taste attributes associated with cocoa may include, e.g.: alkali, aromatic, astringent, bitter, chocolate, cocoa, fruity, roasted, sour, baggy, burnt and earthy. Some examples of aroma attributes associated with cocoa may include, e.g., pungent, cocoa, musty, malty, bready, sweet, chocolate, vanilla and bitter.

It has been discovered that a variety of these attributes can be obtained from the roasted green banana flour (either native or pre-gelatinized) of the present disclosure.

Thus, according to some examples, roasted green banana flour in accordance with the present disclosure will have at least one of the sensory attributes associated with cocoa. According to other examples, roasted green banana flour in accordance with the present disclosure will have at least two of the sensory attributes associated with cocoa. According to other examples, roasted green banana flour in accordance with the present disclosure will have at least three of the sensory attributes associated with cocoa. According to other examples, roasted green banana flour in accordance with the present disclosure will have four or more of the sensory attributes associated with cocoa.

In some examples, roasted green banana flour of the present disclosure includes only roasted native green banana flour. In some examples, roasted green banana flour of the present disclosure includes only roasted pre-gelatinized green banana flour. In some examples, roasted green banana flour of the present disclosure includes both roasted pre-gelatinized green banana flour and roasted native green banana flour.

In some examples, roasted green banana flour of the present disclosure includes green banana flour made from one or more of: plantains, green bananas in Stage 1 of ripeness, green bananas in Stage 2 of ripeness, green bananas in Stage 3 of ripeness, and/or green bananas in Stage 4 of ripeness. In particular examples, roasted green banana flour of the present disclosure includes green banana flour made only from one or more of: plantains, green bananas in Stage 1 of ripeness, and/or green bananas in Stage 2 of ripeness.

Referring now to the FIGURE, in an example process 100 of preparing roasted green banana flour in accordance with the present disclosure, in an optional step 102 green banana flour is evenly distributed on a substantially flat surface, such as a tray, such that grouping or clumping of the green banana flour are minimized, and such that a substantially uniform layer of the green banana flour is formed on the surface. In some examples, a non-stick material, such as a parchment paper, can line the flat surface to minimize sticking of the green banana flour to the surface.

In a subsequent step 104 the green banana flour is roasted for a predefined time at a predefined temperature.

In an optional subsequent step 106, the green banana flour is redistributed on the flat surface such that grouping and clumping of the green banana flour are minimized, and such that a substantially uniform layer of the green banana flour is formed on the surface.

In an optional subsequent step 108, the green banana flour is roasted for a predefined time.

In an optional subsequent step 110, the steps 106 and 108 are repeated in sequence one, two, three, or more times, although the predefined time and/or temperature for each roasting may vary.

In an optional subsequent step 112, the roasted green banana flour is cooled, e.g., by placing a tray holding the roasted green banana flour on a wire rack.

In an optional step 114, the cooled (or not cooled) roasted green banana flour is packaged, e.g., in a hermetically sealed package or added to a food product as a cocoa alternative.

In an optional step 116, the roasted green banana flour is added to a food product as a cocoa alternative.

The roasting step(s) of the process 100 can be facilitated by any appropriate heat source, e.g., a convection oven. The roasting steps can include one or more of air roasting, fluidized bed roasting, drum roasting, oven roasting, rotary tray roasting and/or coffee roasting.

In some examples, the predefined temperature of each of one or more of the roasting(s) in the process 100 is in a range from 160° C. to 220° C. In some examples, the predefined temperature of one or more of the roasting(s) in the process 100 is in a range from 170° C. to 205° C. In some examples, the predefined temperature of one or more of the roasting(s) in the process 100 is in a range from 190° C. to 205° C. In some examples, the predefined temperature of one or more of the roasting(s) in the process 100 is in a range from 176° C. to 177° C.

Variations in the example temperatures and times can vary from those described herein, such as variations of up to +/−10 percent, or up to +/−20 percent. Additionally, the times and temperatures can be different depending on the volume of green banana flour being processed.

It should also be appreciated that the use of different roasting temperatures and/or combinations of roasting temperatures can result in different cocoa-like sensory attribute profiles of the final roasted green banana flour. In at least some examples, the roasting temperature(s) is/are selected to minimize burnt flavors or aromas in the final roasted green banana flour.

In some examples, the predefined heating time of each of one or more of the roasting(s) in the process 100 is in a range from 10 minutes to 60 minutes. In some examples, the predefined heating time of each of one or more of the roasting(s) in the process 100 is in a range from 15 minutes to 45 minutes. In some examples, the predefined heating time of each of one or more of the roasting(s) in the process 100 is in a range from 15 minutes to 30 minutes. In some examples, the total combined roasting time from all the roasting steps of the process 100 is in a range from 10 minutes to 120 minutes. In some examples, the total combined roasting time from all the roasting steps of the process 100 is in a range from 10 minutes to 60 minutes. In some examples, the total combined roasting time from all the roasting steps of the process 100 is in a range from 15 minutes to 45 minutes. In some examples, the total combined roasting time from all the roasting steps of the process 100 is in a range from 15 minutes to 30 minutes. In some examples, the process 100 includes two, three, or four of the roasting steps, each of the roasting steps being in a range from 176° C. to 177° C. for 15 minutes or approximately 15 minutes.

In some examples, between roasting steps of the process 100, the green banana flour is allowed to cool by a predefined amount.

The process 100 can include one, two, three, four, five, six or more of the roasting steps, optionally with a redistribution of the green banana flour and/or cooling of the green banana flour between some or all of the roasting steps.

The roasted green banana flour produced by the process 100 can be used as an all-natural cocoa or chocolate alternative in a variety of foods and can have one or more of the following properties: all-natural, clean label, vegetarian, vegan, kosher, halal, gluten free, conventional or organic, containing fiber material and/or resistant starch, non-GMO, having chocolate flavor and notes but contains no chocolate, and allow for reduction or replacement of real chocolate or cocoa in a range of applications. The roasted green banana flour produced by the process 100 can provide viscosity enhancements, and/or nutritional enhancements to a food product, such as potassium, magnesium and manganese. In addition, the roasted green banana flour produced by the process 100 can be made from 100% fruit.

Cocoa and chocolate have known sensory attributes. These attributes are sometimes defined as including, for example, appearance, odor/aroma, flavor, texture, and global quality. In some examples, the roasted green banana flour produced by the process 100 shares at least one, two or more of the sensory attributes of cocoa or chocolate, such as: a chocolate smell, a chocolate flavor, bitterness, a toasted smell, a toasted flavor, a brown color, and/or sweetness.

FOOD PRODUCT EXAMPLES

Described below are three example food products prepared with cocoa and/or roasted green banana flour, as well as experiments conducted to compare each of the example food products as between a control, which contained no roasted green banana flour, and test samples in which some amount of the cocoa was replaced with roasted green banana flour.

In the test samples, the green banana flour used for roasting included one or both of NuBana™ N100 (native) green banana flour and NuBana™ P500 (pre-gelatinized) green banana flour (available from International Agriculture Group, 106 LangTree Village Drive, Suite 301, Mooresville, N.C. 28117). The green banana flour was roasted using a conventional oven on baking sheets. The sample weight of green banana flour per sheet was 300 g. The baking sheet was then placed in a pre-heated oven at the predefined temperature and roasted for the predefined time. Roasting temperatures were accomplished at 163° C., 177° C., 190° C., 205° C. and 218° C. and the roasting times varied from 15 to 60 minutes in 5-minute increments. Once the green banana flour had been roasted for the appropriate amount of time the sheet was removed from the oven and allowed to cool to room temperature by placing the tray on a wire rack. The roasted green banana flour was then placed in a sealed container for storage or until testing could be accomplished.

Food Product Example 1—Preparation of Non-Dairy Chocolate Drink

A total of 60 g of cocoa powder was mixed with 20 g of granulated sugar and mixed until uniform. A coffee filter was placed in a 10 cm long stemmed glass funnel and the mixture of roasted cocoa powder and sugar was placed in the coffee filter. A total of 1 L of boiling water (100° C.) was poured through the filter and collected in a 2 L beaker. The liquid product was then placed aside to cool to room temperature (20° C.-25° C.). The liquid product was placed in a sealed glass container until taste testing could be performed.

Food Product Example 2—Preparation of a Dairy Chocolate Drink

A mixture of 12 g of cocoa powder and 6 g of granulated table sugar were diluted with 200 g of a half cream—half whole milk dairy product at 18° C. The mixture was placed in a Waring® blender and blended on high for 70 seconds. The sample was removed from the blender cup and placed in a sealed container until taste testing was conducted. The beverages were tasted at 21° C.

Food Product Example 3—Preparation of a Chocolate Coating Compound

The preparations were prepared using a mixing ball mill (Selmi Micro Ball Mill, available from Selmi, Via Statale, 151-12069 Santa Vittoria d'Alba) using the following procedure. The test sample compositions are shown below in Table 1.

Approximately half of the oil and all of the sugar and salt were added to the top of the ball mill. The mixture was milled and recirculated for 3-5 minutes. The temperature of the mill was not permitted to exceed 50° C. Cooling was used as necessary to maintain the temperature below 50° C. The lecithin, milk powder and remaining oil (holding back 2%) was added and milled until the fineness of the product was below 30 microns. The fineness was checked in a mixture of 30% mineral oil with a handheld micrometer. The content of the mill was emptied into a clean mixing bowl and the cocoa powder and roasted green banana flour was added to the mixture and mixed with a standard baking mixer at low to medium speed with a mixing attachment, scraping the sides occasionally. During mixing, heat was added to the bowl by means of a heat gun keeping the mixture between 45° C. and 50° C. The formulation was mixed for 10-15 minutes until completely uniform.

TABLE 1

Formulations for a chocolate coating compound

| Ingredient* | Control | 1 | 2 | 3 | 4 | 5 |
|---|---|---|---|---|---|---|
| Sugar | 55.45 | 55.45 | 55.45 | 55.45 | 55.45 | 55.45 |
| Palm Kernel Oil | 29 | 29 | 29 | 29 | 29 | 29 |
| Whole Milk Powder | 3 | 3 | 3 | 3 | 3 | 3 |
| Sunflower Lecithin | 0.5 | 0.5 | 0.5 | 0.5 | 0.5 | 0.5 |
| Salt | 0.05 | 0.05 | 0.05 | 0.05 | 0.05 | 0.05 |
| Natural Cocoa Powder | 12 | 10.8 | 10.8 | 9 | 6 | 6 |
| NuBana ™ N100 green banana flour roasted 40 minutes @ 205° C. | — | 1.2 | — | 3 | 6 | 3 |
| NuBana ™ P500 green banana flour roasted 15 minutes @ 205° C. | — | — | 1.2 | — | — | — |

*all values are in parts by mass

Sensory Attribute Experiments

To establish a sensory attribute baseline, a panel tested the flavor and aroma attributes associated with cocoa powder. The panel was trained on attribute descriptors using the following definitions and references.

Attribute: Acid/Sour
Definition: the taste stimulated by acids.
Reference: 0.08% citric acid in water.
Attribute: Bitter
Definition: the taste stimulated by caffeine.
Reference: caffeine in spring water (0.1% concentration).
Attribute: Cacao:
Definition: the characteristic aroma of roasted cocoa beans.
Reference: Ivory Coast roasted cocoa nibs (cocoa mass, lab scale).
Attribute: Roasted
Definition: the aroma associated with food items that have been browned by heat treatment.
Attribute: Alkaline
Definition: the aroma associated with baking soda.
Reference: salt solution (0.7%; 1.4 grams salt to 300 grams water) as compared with a baking soda solution (5% solution, or 15 grams baking soda to 300 g water)
Attribute: Hay/Straw
Definition: the aroma associated with sweet, sun-dried grasses.
Reference: hay, dried parsley.
Attribute: Earthy:
Definition: the aroma associated with topsoil.
Reference: raw skins of russet potatoes.
Attribute: Moldy/Jute Bag
Definition: the aroma reminiscent of items stored under highly humid conditions (damp basements, molds).
Reference: brie cheese.
Attribute: Smoky Definition: the aroma associated with wood smoke odor.
Reference: liquid smoke.

Experiment 1:

The trained panel was presented with a control preparation containing cocoa powder and a test sample preparation containing NuBana™ N100 green banana flour roasted at 205° C. for the times shown below. All taste tests were conducted at room temperature. The panelists sampled preparations of the cocoa control and the roasted green banana flour prepared according to Food Product Example 1 above, wherein for the test samples NuBana™ N100 green banana flour was substituted for the cocoa powder.

Results:
Cocoa Control:

| Panelist 1 | Panelist 2 | Panelist 3 | Panelist 4 | Panelist 5 | Panelist 6 |
|---|---|---|---|---|---|
| astringent | astringent | sour/bitter | sweet | astringent | bitter |
| bitter | bitter | sweet | bitter | sweet | sweet |
| | | | | | roasted |
| sweet | sweet | cocoa | cocoa | sour | sour |
| cocoa | low cocoa | tongue drying | | bitter | cocoa |
| | sour | | | | |

NuBana™ N100 green banana flour roasted for 15 minutes:

| Panelist 1 | Panelist 2 | Panelist 3 | Panelist 4 | Panelist 5 | Panelist 6 |
|---|---|---|---|---|---|
| bitter | bitter | bitter | astringent | bitter | astringent |
| sweet | sweet fruity | astringent | sweet | sour | sour |
| astringent | | sweet | sour | sweet | |
| sour | | sour | bitter astringent tongue drying | | fruity tongue |

NuBana™ N100 green banana flour roasted for 20 minutes:

| Panelist 1 | Panelist 2 | Panelist 3 | Panelist 4 | Panelist 5 | Panelist 6 |
|---|---|---|---|---|---|
| bitter | bitter | sour/bitter | astringent | astringent | bitter |
| sweet | astringent | sweet | sweet | sweet | sweet |
| astringent | sweet | cocoa | sour | sour | sour |
| roasted | | tongue drying | bitter | bitter | roasted cocoa |
| sour | | | | fruity | astringent |

NuBana™ N100 green banana flour roasted for 30 minutes:

| Panelist 1 | Panelist 2 | Panelist 3 | Panelist 4 | Panelist 5 | Panelist 6 |
|---|---|---|---|---|---|
| bitter | astringent | bitter | bitter | | bitter |
| sweet | burnt | burnt | | | sweet |
| | | | | | roasted |
| astringent | sweet | roasted | | | sour |
| roasted | | | | | |
| cooked | | | | | |
| sugar | | | | | |

NuBana™ N100 green banana flour roasted for 40 minutes:

| Panelist 1 | Panelist 2 | Panelist 3 | Panelist 4 | Panelist 5 | Panelist 6 |
|---|---|---|---|---|---|
| bitter | bitter | harsh bitter | bitter | burnt bitter | |
| astringent | astringent | tongue burning | BURNT burnt coffee ground | | |
| | hammy | | Cross between eating used coffee grounds and cigarettes. | chewing a smoked cigarette | I feel like I licked an ash tray |

NuBana™ N100 green banana flour roasted for 50 minutes:

| Panelist 1 | Panelist 2 | Panelist 3 | Panelist 4 | Panelist 5 | Panelist 6 |
|---|---|---|---|---|---|
| astringent | bitter | bitter | bitter burnt | cannot distinguish so burnt and awful | cannot taste past the smoky ashtray |
| bitter | | | | | |
| smoky | | | | | |

Conclusions from Experiment 1: Shorter roasting times of the green banana flour may provide for more sour, fruity notes. As the green banana flour is roasted for longer periods of time, sour, fruity notes may be perceived less and new flavors develop, such as coffee flavor, roasted flavor, smoky and burnt. Thus, adjusting roasting times and temperatures of green banana flour in accordance with the present disclosure can result in a variety of sensory attributes.

Experiment 2:

The trained panel, including a sensory expert, was presented with a control preparation containing cocoa powder and a test sample preparation containing NuBana™ N100 green banana flour roasted at 205° C. for the times shown below. All taste tests were conducted at room temperature. The panelists sampled preparations of the cocoa control and the roasted green banana flour prepared according to Food Product Example 2 above, wherein for the test samples NuBana™ N100 green banana flour was substituted for the cocoa powder.

The panel's sensory results from Experiment 2 are summarized as follows:

Cocoa Control: dairy, sweet, sour, bitter, astringent.

NuBana™ N100 green banana flour roasted for 15 minutes: sweet, dairy, sour, bitter, astringent, fruity.

NuBana™ N100 green banana flour roasted for 20 minutes: sweet, dairy, bitter, astringent sour, tongue drying sensation.

NuBana™ N100 green banana flour roasted for 30 minutes: dairy, sweet bitter, astringent, roasted, coffee.

NuBana™ N100 green banana flour roasted for 40 minutes: dairy, sweet, bitter, astringent, burnt, roasted, smoke.

Conclusions from Experiment 2: The NuBana™ N100 green banana flour roasted for 30-40 minutes at 205° C. produced roasted flavors that enhance a natural cocoa powder when blended into a dairy chocolate drink.

Experiment 3:

All samples were prepared by the methods described in Food Product Example 3 above, wherein in the control sample cocoa powder was substituted for the roasted green banana flour. In this experiment, sensory attributes of the test sample containing roasted green banana flour were also measured on a "degree of difference" (DOD) scale, used to represent how similar the test sample was to the control sample, the scale operating from 1 to 7, 1 representing no difference and 7 representing significant difference. In this experiment the NuBana™ N100 green banana flour was roasted at 205° C. for 40 minutes and had a pH before roasting of about 4, and the green banana flour was approximately 6 months old.

Results
Control—12% cocoa

| Panelist 1 | Panelist 2 | Panelist 3 | Panelist 4 | Panelist 5 | Panelist 6 | Panelist 7 |
|---|---|---|---|---|---|---|
| sweet | dairy | sweet | sweet | sweet | creamy dairy | low sweet |
| dairy cocoa | sweet cocoa | dairy | dairy cocoa | dairy cocoa | sweet low cocoa | dairy |
|  |  |  |  | slight plastic |  |  |

Test Sample 1—10% replacement of the cocoa powder with roasted NuBana™ N100 green banana flour heated at 205° C. for 40 minutes.

| | Panelist 1 | Panelist 2 | Panelist 3 | Panelist 4 | Panelist 5 | Panelist 6 | Panelist 7 |
|---|---|---|---|---|---|---|---|
| | sweet | sweet | sweet | sweet | sweet | sweet | slow release of flavor |
| | dairy | cocoa | dairy | cocoa | dairy | creamy dairy | low sweet |
| | cocoa | | | | cocoa | low cocoa | dairy |
| | | | slow flavor release | same as control | no off notes | no difference from control | slight Palm oil |
| DOD* | 2 | 2 | 3 | 1 | 3 | 1 | 3 |

*= Degree Of Difference

The sensory expert commented that Test Sample 1 was very comparable to the control formulation in that the average consumer would not likely be able to tell the difference. It had a slightly slower flavor release, less cocoa flavor and had slight palm oil notes at the end, rating it as a DOD of 4.

Test Sample 2—10% replacement of the cocoa powder with roasted NuBana™ P500 (pre-gelatinized) green banana flour heated at 205° C. for 15 minutes

| | Panelist 1 | Panelist 2 | Panelist 3 | Panelist 4 | Panelist 5 | Panelist 6 | Panelist 7 |
|---|---|---|---|---|---|---|---|
| | | cocoa | sweet | sweet | dairy | sweet | slow flavor release sweet |
| | Sweet Dairy | sweet | dairy | chocolate flavor | sweet | cocoa | cocoa |
| | Cocoa | | cocoa | | cocoa | | |
| | | slight bitter | More chocolate flavor | | mocha aftertaste | bitter aftertaste | |
| DOD* | 2 | 4 | 4 | 3 | 4 more flavor | 4 | |

*= Degree Of Difference

The sensory expert commented that Test Sample 2 tasted like flavor was added to the compound coating. In addition, Test Sample 2 had interesting flavor built over time, providing an attribute greater than the cocoa powder that had a roasted coffee-like attribute.

Test Sample 3—25% replacement of the cocoa powder with roasted NuBana™ N100 green banana flour heated at 205° C. for 40 minutes

| | Panelist 1 | Panelist 2 | Panelist 3 | Panelist 4 | Panelist 5 | Panelist 6 |
|---|---|---|---|---|---|---|
| | sweet cocoa | cocoa sweet | sweet cocoa | sweet cocoa bitter | dairy sweet cocoa | sweet cocoa |
| | | | Slight tongue drying | more overall initial flavor | mocha aftertaste | bitter aftertaste |
| DOD* | 4 | 4 | 4 | 5 | 5 | 5 |

*= Degree Of Difference

The sensory expert commented that Test Sample 3 had high end attributes like high end cocoa powders. In addition, Test Sample 3 had a longer flavor release with more intensive chocolate flavor, providing for an intensified chocolate flavor at the front end and at the back end.

Test Sample 4—50% replacement of the cocoa powder with roasted NuBana™ N100 green banana flour heated at 205° C. for 15 minutes

| Panelist 1 | Panelist 2 | Panelist 3 | Panelist 4 | Panelist 5 | Panelist 6 |
|---|---|---|---|---|---|
| sweet cocoa | cocoa chocolate | sweet cocoa | roasted cocoa | sweet | sweet cocoa |

-continued

|        | Panelist 1 | Panelist 2 | Panelist 3 | Panelist 4 | Panelist 5 | Panelist 6 |
|--------|------------|------------|------------|------------|------------|------------|
|        | slow flavor release chewy texture | grainy | bitter | burnt cocoa sweet astringent | cocoa smoky/hammy higher finest | burnt granular |
| DOD*   | 5          | 5          | 5          | 6          | 6          | 5          |

*= Degree of difference

The sensory expert commented that the larger particle size of Test Sample 4 impacted flavor release, and a different flavor attribute was introduced at the end resembling burnt caramelized sugar, the flavor ending slightly bitter. Some cocoa powders share these attributes.

Test Sample 5—25% reduction in total cocoa powder.

Because more intense chocolate flavor was found at 25% cocoa replacement (from the results in Test Sample 3, above), the formulation was repeated for testing designed to identify if less total cocoa powder could produce a similar flavor intensity.

|        | Panelist 1 | Panelist 2 | Panelist 3 | Panelist 4 | Panelist 5 | Panelist 6 |
|--------|------------|------------|------------|------------|------------|------------|
|        | sweet      | sweet      | sweet cocoa | sweet     | sweet      | sweet      |
|        |            | low cocoa  |            | low bitter | cocoa      | low cocoa  |
|        | sweet      |            | sweet      | sweet mostly | sweet    | sweet      |
| DOD*   | 5          | 4          | 5          | 5          | 5          | 5          |

*= Degree of difference

The sensory expert commented that the Test Sample 5 had less cocoa flavor, and was sweeter, but had no off notes. The sample was comparable to a carob like product with a reduced overall cocoa flavor. The sensory expert expressed surprise that no off flavors were noted.

Conclusions from Experiment 3: The degree of sensory difference observed by the panelists generally increased as more cocoa powder was replaced with roasted green banana flour. However, even at relatively high levels of cocoa replacement, panelists and the sensory expert identified several sensory attributes and accompanying intensities in common with cocoa or chocolate.

Experiment 4:

All control and test samples were prepared by the methods described in Food Product Example 3 above, wherein roasted green banana flour (NuBana™ GBF P500) was used at 10, 25 and 50% replacement of the cocoa. In this experiment, sensory attributes of the test samples containing roasted green banana flour were also measured by five panelists on a "degree of difference" (DOD) scale, used to represent how similar the test sample was to the control sample, the scale operating from 1 to 7, 1 representing no difference and 7 representing significant difference. In this experiment the NuBana™ P500 green banana flour was roasted at 205° C. for 40 minutes and had a pH before roasting of about 6.57, and the green banana flour was approximately two weeks old. The results of the taste panel are shown below.

|            |                | Test Sample 1, 10% cocoa replacement with Roasted NuBana ™ P500 green banana flour | Test Sample 2, 25% cocoa replacement with Roasted NuBana ™ P500 green banana flour | Test Sample 3, 50% cocoa replacement with Roasted NuBana ™ P500 green banana flour |
|------------|----------------|---------|---------|---------|
| Panelist 1 | Control Sample |         |         |         |
| Color      | Medium Brown   | Medium Brown | Medium Brown | Medium Brown |
| Flavor     | Sweet Cocoa Dairy | Sweet Cocoa Dairy | Sweet Mocha Cocoa | Sweet Cocoa Coffee ground like bitter Astringent |
|            |                |         | Dairy   |         |
| DOD        |                | 2       | 4       | 5       |
| Comments   |                |         |         | Slow Flavor Release, Granular mouthfeel |

|            |                | Test Sample 1, 10% cocoa replacement with Roasted NuBana ™ P500 green banana flour | Test Sample 2, 25% cocoa replacement with Roasted NuBana ™ P500 green banana flour | Test Sample 3, 50% cocoa replacement with Roasted NuBana ™ P500 green banana flour |
|------------|----------------|---------|---------|---------|
| Panelist 2 | Control Sample |         |         |         |
| Color      | Medium Brown   | Medium Brown | Medium Brown | Medium Brown |
| Flavor     | Sweet Cocoa Dairy | Sweet Cocoa Dairy | Sweet Mocha Cocoa Dairy | Sweet Mocha Cocoa Bitter |
| DOD        |                | 2       | 4       | 5       |
| Comments   |                |         |         | Tongue drying astringent |

|            |                | Test Sample 1, 10% cocoa replacement with Roasted NuBana ™ P500 green banana flour | Test Sample 2, 25% cocoa replacement with Roasted NuBana ™ P500 green banana flour | Test Sample 3, 50% cocoa replacement with Roasted NuBana ™ P500 green banana flour |
|------------|----------------|---------|---------|---------|
| Panelist 3 | Control Sample |         |         |         |
| Color      | Medium Brown   | Medium Brown | Medium Brown | Medium Brown |
| Flavor     | Sweet Cocoa Dairy | Sweet Cocoa Dairy | Sweet Cocoa Dairy | Sweet Cocoa Bitter Astringent Tasted something else added vanilla mocha |
| DOD        |                | 2       | 3       | 5       |
| Comments   |                |         |         | Slow Flavor Release, Granular mouthfeel |

| | | Test Sample 1, 10% cocoa replacement with Roasted NuBana™ P500 green banana flour | Test Sample 2, 25% cocoa replacement with Roasted NuBana™ P500 green banana flour | Test Sample 3, 50% cocoa replacement with Roasted NuBana™ P500 green banana flour |
|---|---|---|---|---|
| Panelist 4 | Control Sample | | | |
| Color | Medium Brown | Medium Brown | Medium Brown | Medium Brown |
| Flavor | Sweet Cocoa Dairy | Sweet Cocoa Dairy | Sweet Cocoa Dairy Higher cocoa notes | Sweet Mocha Cocoa Bitter Astringent |
| DOD | | 2 | 3 | 5 |
| Comments | | | | Slow Flavor Release, Granular mouthfeel |

| | | Test Sample 1, 10% cocoa replacement with Roasted NuBana™ P500 green banana flour | Test Sample 2, 25% cocoa replacement with Roasted NuBana™ P500 green banana flour | Test Sample 3, 50% cocoa replacement with Roasted NuBana™ P500 green banana flour |
|---|---|---|---|---|
| Panelist 5 | Control Sample | | | |
| Color | Medium Brown | Medium Brown | Medium Brown | Medium Brown |
| Flavor | Sweet Cocoa Dairy | Sweet Cocoa Dairy | Sweet Mocha/cocoa Dairy | Sweet Mocha Cocoa Bitter Astringent |
| DOD | | 1 | 4 | 5 |
| Comments | | Same product | Added mocha to the cocoa flavor | Slow Flavor Release, Gritty. Harsh aftertaste |

Conclusion from Experiment 4: roasted green banana flour with a higher pre-roasting pH gave better taste profiles without the development of the burnt and off tastes that were seen in the lower pH samples (e.g., Experiment 3). In addition, at the higher pH more complex flavor attributes were noted, resembling a higher end cocoa product.

Experiment 5:

A compound coating was made using the standard ball mill procedure with the ingredients from Food Product Example 3 above, but without the cocoa or roasted green banana flour. The batch was split and cocoa powder was added at 12% usage for the control and a blend of cocoa powder and roasted NuBana™ P500 green banana flour (roasted at 205° C. for 40 minutes) was used for each of three test samples as shown in the table below. The powders were added and mixed in a standard baking mixer. The compound samples were molded at 37° C. in wafer molds and put in a freezer for 5 minutes to set up before demolding. Viscosities were measured for the test sample and the control samples using a HA Brookfield™ viscometer at 20 RPM, #27 Spindle at 60° C.

Results:

TABLE 2 viscosities of formulated chocolate coating

| Sample | Viscosity HA Brookfield at 20 RPM, #27 Spindle at 50° C. (% torque) |
|---|---|
| Control - 12% cocoa powder | 25 |
| Test Sample 6-10.8% cocoa powder, 1.2% roasted NuBana™ P500 green banana flour | 35 |
| Test Sample 7-9% cocoa powder, 3% roasted NuBana™ P500 green banana flour | 38 |
| Test Sample 8-6% cocoa powder, 6% roasted NuBana™ P500 green banana flour | 36 |

Conclusions from Experiment 5: The viscosities of the compound coating sample tests were averaging 10% higher than the control sample. Though not highly significant, this margin could be attributed to the 12% cocoa butter that is intrinsically in cocoa powder or could be due to the differences in particle size distribution between the control and test samples. Furthermore, viscosity could be easily adjusted by the addition of 1-2% palm kernel oil (e.g., the held back 2% of the oil from the Food Product Example 3 method). With respect to color results, the color on all samples was medium to dark brown. There was not a noticeable difference in color between the control and test samples.

As used herein, the phrase "at least one and up to six or more" includes at least one, at least two, at least three, at least four, at least five, and at least 6, and more than 6.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A composition for a cocoa alternative comprising roasted green banana flour formed from a dried green banana slurry made from peeled mashed green bananas and/or roasted plantain flour formed from a dried green plantain slurry made from peeled mashed green plantains, and comprising no cocoa, no cacao, and no derivative of cocoa or cacao,
    wherein the composition has sensory attributes comprising at least one of: a cocoa aroma or a cocoa flavor, and
    wherein the roasted green banana flour or the roasted plantain flour were roasted for 10 minutes to 60 minutes at a temperature from 160° C. to 220° C.

2. The composition of claim 1, wherein the composition comprises roasted green banana flour made from green bananas in Stage 1 and/or Stage 2 of ripeness.

3. The composition of claim 1, wherein the roasted green banana flour is made from native green banana flour.

4. The composition of claim 1, wherein the roasted green banana flour is made from pre-gelatinized green banana flour.

5. A composition comprising cocoa powder and a flour that has been roasted and formed from a dried green banana slurry made from peeled mashed green bananas and/or a dried green plantain slurry made from peeled mashed green plantains, the cocoa powder and the flour that has been roasted having a combined total mass, the roasted flour having a mass from 5% to 90% of the combined total mass, and being roasted from 10 minutes to 60 minutes at a temperature from 160° C. to 220° C.;

wherein the flour has sensory attributes comprising at least one of: a cocoa aroma or a cocoa flavor.

6. The composition of claim 5, wherein the roasted flour has a mass from 5% to 75% of the combined total mass.

7. The composition of claim 5, wherein the roasted flour has a mass from 5% to 50% of the combined total mass.

8. The composition of claim 5, wherein the roasted flour has a mass from 5% to 25% of the combined total mass.

9. The composition of claim 5, wherein the roasted flour has a mass from 5% to 10% of the combined total mass.

10. The composition of claim 5, wherein the roasted flour comprises green bananas in Stage 1 and/or Stage 2 of ripeness.

11. The composition of claim 5, wherein the roasted flour comprises roasted green banana flour made from native green banana flour and/or roasted plantain flour made from native plantain flour.

12. The composition of claim 5, wherein the roasted flour comprises roasted green banana flour made from pre-gelatinized green banana flour and/or roasted plantain flour made from pre-gelatinized plantain flour.

13. The composition of claim 5, further comprising one or both of: sugar not present in or derived from the roasted flour or the cocoa powder; and/or dairy.

14. A method of preparing a composition for a cocoa alternative comprising: peeling green bananas and/or plantains, mashing the peeled green bananas and/or plantains to form a slurry thereof, drying the slurry to form a green banana flour and/or a plantain flour, roasting the flour consisting only of green banana flour and/or plantain flour for 10 minutes to 60 minutes at a temperature from 160° C. to 220° C.

15. The method of claim 14, wherein the flour comprises green banana flour made from green bananas in Stage 1 and/or Stage 2 of ripeness.

16. The method of claim 14, wherein the flour is made from native green banana flour and/or native plantain flour.

17. The method of claim 14, wherein the flour is made from pre-gelatinized green banana flour and/or pre-gelatinized plantain flour.

18. The method of claim 14, wherein the roasting is performed for only one continuous period of time or for a plurality of discontinuous periods of time.

19. The method of claim 18, wherein the one continuous period of time or a sum of the plurality of discontinuous periods of time is between 10 minutes and 60 minutes.

20. The method of claim 18, wherein the one continuous period of time or a sum of the plurality of discontinuous periods of time is between 15 minutes and 45 minutes.

21. The method of claim 19, wherein the roasting is performed at a temperature from 163° C. to 218° C.

22. The method of claim 19, wherein the roasting is performed at a temperature from 177° C. to 205° C.

23. The method of claim 19, wherein the roasting is performed at a temperature from 190° C. to 205° C.

24. The method of claim 14, wherein before the roasting the flour has a pH of at least 5.0.

25. The method of claim 14, wherein before the roasting the flour has a pH of at least 6.0.

26. The method of claim 14, wherein before the roasting the flour has a pH of at least 6.5.

27. The composition of claim 1, wherein the composition comprises roasted green banana flour made from green bananas having less than 1% sugar content.

* * * * *